(12) United States Patent
Jaradi et al.

(10) Patent No.: US 11,697,391 B1
(45) Date of Patent: Jul. 11, 2023

(54) VEHICLE SEATBELT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/749,450

(22) Filed: May 20, 2022

(51) Int. Cl.
*B60R 22/20* (2006.01)
*B60R 22/34* (2006.01)
*B60R 22/46* (2006.01)

(52) U.S. Cl.
CPC ............ *B60R 22/203* (2013.01); *B60R 22/34* (2013.01); *B60R 2022/208* (2013.01); *B60R 2022/4685* (2013.01)

(58) Field of Classification Search
CPC ............ B60R 22/203; B60R 2022/208; B60R 22/206; B60R 22/19; B60R 22/1955; B60R 2022/1957; B60R 22/20; B60R 22/201; B60R 22/34; B60R 2022/4685
See application file for complete search history.

(56) References Cited

U.S. PATENT DOCUMENTS

| | | | |
|---|---|---|---|
| 3,332,720 A | | 7/1967 | Hansen |
| 4,695,076 A * | | 9/1987 | Hane ............... B60R 22/206 |
| | | | 297/483 |
| 4,892,331 A * | | 1/1990 | Wollner ............ B60R 22/201 |
| | | | 411/401 |
| 5,615,917 A * | | 4/1997 | Bauer ............... B60R 22/206 |
| | | | 297/483 |
| 8,052,170 B2 | | 11/2011 | Pelliccia et al. |
| 9,434,349 B1 * | | 9/2016 | Perkins ............... B60R 22/03 |
| 10,035,513 B2 | | 7/2018 | Miller et al. |
| 2004/0251366 A1 * | | 12/2004 | Hishon ............... B60R 22/44 |
| | | | 242/390.8 |
| 2013/0009391 A1 | | 1/2013 | Miller et al. |
| 2017/0267208 A1 * | | 9/2017 | Marriott ............ B60R 22/203 |
| 2019/0135227 A1 * | | 5/2019 | Jaradi ............... B60R 22/202 |

(Continued)

FOREIGN PATENT DOCUMENTS

| | | | | |
|---|---|---|---|---|
| CN | 108045341 A | * | 5/2018 | ............ B60R 22/20 |
| DE | 102016107333 A1 | * | 10/2016 | ............ B60K 37/00 |

(Continued)

*Primary Examiner* — Paul N Dickson
*Assistant Examiner* — Matthew D Lee
(74) *Attorney, Agent, or Firm* — Frank A. MacKenzie; Bejin Bieneman PLC

(57) ABSTRACT

A system includes a pillar and a seatbelt retractor. The system includes a D-ring supported by and vertically movable relative to the pillar. The system includes a webbing extending from the seatbelt retractor and through the D-ring, The system includes an actuator operatively coupled to the D-ring to vertically move the D-ring relative to the pillar. The system includes a computer having a processor and a memory storing instructions executable by the processor to determine that the seatbelt retractor in a nuisance locked state, and in response determining that the seatbelt retractor is in the nuisance locked state, command the actuator to move the D-ring vertically downward relative to the pillar.

18 Claims, 7 Drawing Sheets

(56) References Cited

U.S. PATENT DOCUMENTS

2020/0339063 A1\* 10/2020 Jaradi .................. B60R 21/013
2023/0015173 A1\* 1/2023 Kim ..................... B60R 22/201

FOREIGN PATENT DOCUMENTS

| GB | 2235617 A | \* | 3/1991 | ........... B60R 22/201 |
| GB | 2237977 A | \* | 5/1991 | ........... B60R 22/201 |
| JP | 2015120454 A | \* | 7/2015 | ............. B60R 22/03 |

\* cited by examiner

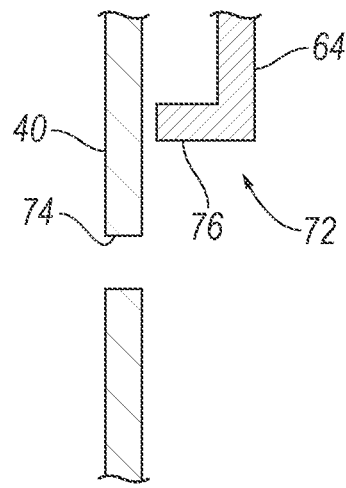
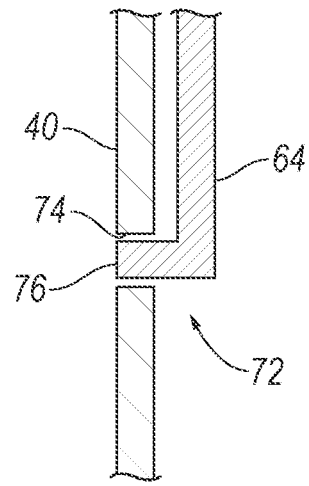
FIG. 5A       FIG. 5B
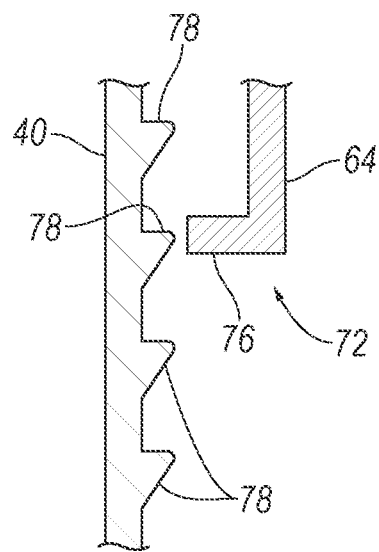
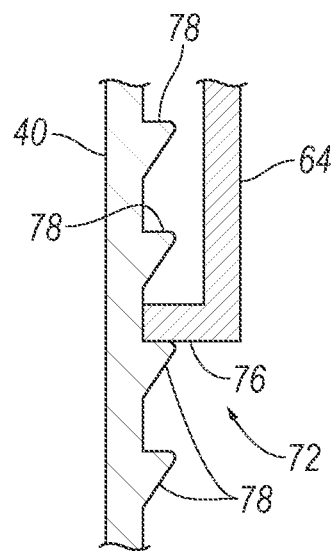
FIG. 6A       FIG. 6B

VEHICLE SEATBELT SYSTEM

BACKGROUND

A vehicle may include a seatbelt assembly. The seatbelt assembly may include a seatbelt retractor and a webbing retractably payable from the seatbelt retractor. The seatbelt assembly may include an anchor coupled to the webbing, and a clip that engages a buckle. The seatbelt assembly may be disposed adjacent a seat of the vehicle. The webbing may extend continuously from the seatbelt retractor to the anchor. For example, one end of the webbing feeds into the seatbelt retractor, and the other end of the webbing is fixed to the anchor. The anchor may, for example, be fixed to the seat. Alternatively, the anchor may be fixed to a vehicle body, e.g., a B-pillar, a floor, etc. The anchor may be attached to the seat in any suitable manner, e.g., with fasteners. The webbing may be fabric, e.g., woven nylon. The clip slides freely along the webbing and, when engaged with the buckle, divides the webbing into a lap band and a shoulder band. The seatbelt assembly may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle body, e.g., the B-pillar. In one example, the seatbelt assembly may be a three-point harness, meaning that the webbing is attached at three points around the occupant when fastened the anchor, the seatbelt retractor, and the buckle. In other examples, the seatbelt assembly may include another arrangement of attachment points.

BRIEF DESCRIPTION OF THE DRAWINGS

FIG. 5A is a cross section of components of the system for decreasing tension of the seatbelt webbing.

FIG. 5B is another cross section of components of the system for decreasing tension of the seatbelt webbing of FIG. 5A.

FIG. 6A is a cross section of components of the system for decreasing tension of the seatbelt webbing.

FIG. 6B is another cross section of components of the system for decreasing tension of the seatbelt webbing of FIG. 6A.

DETAILED DESCRIPTION

Figure 1:
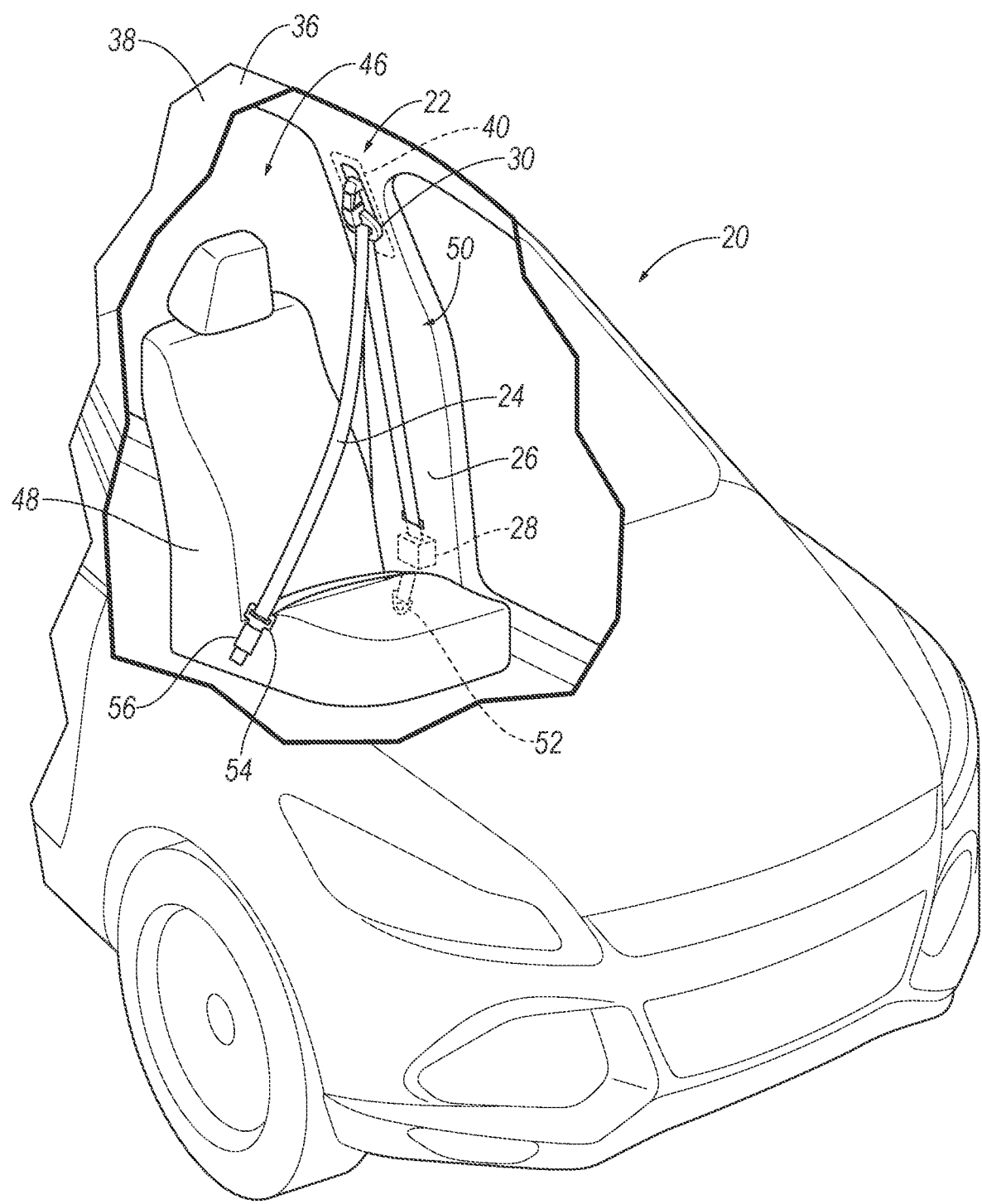
FIG. 1 is a perspective view of a vehicle with a system for decreasing tension of a seatbelt webbing.

An system includes a pillar and a seatbelt retractor. The assembly includes a D-ring supported by and vertically movable relative to the pillar. The assembly includes a webbing extending from the seatbelt retractor and through the D-ring. The assembly includes an actuator operatively coupled to the D-ring to vertically move the D-ring relative to the pillar. The assembly includes a computer having a processor and a memory storing instructions executable by the processor to determine that the seatbelt retractor in a nuisance locked state, and in response determining that the seatbelt retractor is in the nuisance locked state, command the actuator to move the D-ring vertically downward relative to the pillar.

The instructions may include instructions to determine that the seatbelt retractor is in the nuisance locked state based on detecting a tension of the webbing that is greater than a threshold.

The system may include an anchor fixed to the webbing and a tension sensor at the anchor and configured to detect the tension of the webbing.

The instructions may include instructions to determine that no impact has been detected before commanding the actuator to move the D-ring vertically downward relative to the pillar.

The system may include a first base supported by and vertically movable relative to the pillar, and the D-ring may be supported by the first base and the actuator may be operatively coupled to the first base to vertically move the first base relative to the pillar.

The D-ring may be vertically movable relative to the first base.

The system may include a pin movable to an engaged position and a disengaged position, the pin in the engaged position inhibiting movement of the D-ring relative to the first base and in the disengaged position permitting movement of the D-ring relative to the first base.

The first base may define a plurality of holes vertically spaced from each other, the pin in the engaged position disposed within one of the plurality of holes.

The system may include a second base supported by and vertically movable relative to the pillar, and the D-ring may be supported by the second base.

The pillar may include a track, and the first base and the second base may be movable along the track.

The track may be between the first base and the second base.

The system may include a stop that limits movement of the second base relative to the track.

The stop may include a slot defined by the track and a tongue extending from the second base.

The stop may include a plurality of teeth arranged along the track.

The actuator may be operatively coupled to the track and the first base to move the first base relative to the track.

The actuator may include a motor fixed relative to the track and a lead screw fixed relative to the first base.

The second base may be vertically movable relative to the first base.

The system may include a pin movable to an engaged position and a disengaged position, the pin in the engaged position inhibiting movement of the second base relative to the first base and in the disengaged position permitting movement of the second base relative to the first base.

With reference to the Figures, where like numerals indicate like features throughout the several views, a vehicle 20 with a system 22 for decreasing tension of a seatbelt webbing 24 is shown. The system 22 includes a pillar 26, a seatbelt retractor 28, and a D-ring 30 supported by and vertically movable relative to the pillar 26. The seatbelt webbing 24 extends from the seatbelt retractor 28 and through the D-ring 30. The system 22 includes an actuator 32 operatively coupled to the D-ring 30 to vertically move the D-ring 30 relative to the pillar 26. The system 22 includes a computer 34 having a processor and a memory storing instructions executable by the processor to determine that the seatbelt retractor 28 in a nuisance locked state, and in response determining that the seatbelt retractor 28 is in the nuisance locked state, command the actuator 32 to move the D-ring 30 vertically downward relative to the pillar 26. Commanding the actuator 32 to move the D-ring 30 vertically downward relative to the pillar 26 may reduce tension in the webbing 24 and relieve the nuisance locked state, e.g., permitting disengagement of the seatbelt retractor 28 such that the webbing 24 is payable into and/or out of the seatbelt retractor 28 and providing increased range of movement for an occupant, etc. Disengagement of the seatbelt retractor 28 and the resultant increased range of movement may alleviate perceived occupant discomfort experienced by the nuisance locked state, e.g., locking of the seatbelt retractor 28 caused by the occupant leaning for too quickly, the vehicle 20 being positioned on a steep decline, etc.

The vehicle 20, shown in FIG. 1, may be any suitable type of ground vehicle, e.g., a passenger or commercial automobile such as a sedan, a coupe, a truck, a sport utility, a crossover, a van, a minivan, a taxi, a bus, etc.

The vehicle 20 includes a vehicle body 36 and frame. The vehicle body 36 may be of a unibody construction in which the frame is unitary with the vehicle body 36 including frame rails, pillars 26, a roof 38, a floor, etc. As another example, the body 36 and frame may have a body-on-frame construction, also referred to as a cab-on-frame construction, in which the body 36 and frame are separate components, i.e., are modular, and the body 36 is supported on and affixed to the frame. Alternatively, the frame and body 36 may have any suitable construction. The frame and body 36 may be of any suitable material, for example, steel, aluminum, and/or fiber-reinforced plastic, etc.

The vehicle 20 includes one or more pillars 26. Each pillar 26 may include a support column, a body panel, and a trim cover. The body panel and the trim cover may have a class-A exterior surface, i.e., a surface specifically manufactured to have a high quality, finished aesthetic appearance free of blemishes. The body panel and trim cover may be supported by the support column. The body panel, the support column, and/or the trim cover may be formed of any suitable material, for example, steel, aluminum, plastic, composite, etc.

The pillars 26 extend downward from the roof 38 toward the floor. One or more of the pillars 26 may each include a track 40. The track 40 may include, for example, channels 42, a slot 44, etc., elongated along a length of the track 40. The channels 42 and slot 44 may be elongated vertically, e.g., away from the roof 38. The track 40 may be supported by the pillar 26, e.g., fix to the support column. The track 40 may be between the trim cover and the body panel.

The body 36 defines a passenger compartment 46 to house occupants, if any, of the vehicle 20. The passenger compartment 46 may extend across the vehicle 20, i.e., from one side to the other side of the vehicle 20. The passenger compartment 46 includes a front end and a rear end with the front end being in front of the rear end during forward movement of the vehicle 20.

The vehicle 20 includes one or more seats 48. The vehicle 20 may include any suitable number of seats 48. The seat 48 may be arranged in the passenger compartment 46 in any suitable position, i.e., as front seats, rear seats, third-row seats, etc. The seat 48 may be movable relative to the floor to various positions, e.g., movable fore-and-aft and/or cross-vehicle. The seats 48 may be of any suitable type, e.g., a bucket seat, a bench seat, etc.

The vehicle 20 includes one or more seatbelt assemblies 50. In the example shown in the Figures, the pillar 26 is a B-pillar between a front door and a rear door of the vehicle 20 and the seatbelt assembly 50 is mounted to the B-pillar. Specifically, the seatbelt retractor 28 is mounted to the B-pillar. In other examples, the seatbelt assembly 50 may be mounted to any suitable pillar of the vehicle 20. In examples including multiple seatbelt assemblies 50, each seatbelt assembly 50 may be at any suitable pillar 26.

The seatbelt assembly 50 includes the seatbelt retractor 28 and the webbing 24 retractably payable from the seatbelt retractor 28. The seatbelt assembly 50 may include an anchor 52 fixed to the webbing 24, and a latch plate 54 that engages a buckle 56. The seatbelt assembly 50 may be disposed adjacent the seat 48. For example, the seatbelt assembly 50 is adjacent the front seat 48. The seatbelt assembly 50, when fastened, controls the kinematics of the occupant on the seat 48, e.g., during sudden decelerations of the vehicle 20. The webbing 24 may extend continuously from the seatbelt retractor 28 to the anchor 52. For example, one end of the webbing 24 feeds into the seatbelt retractor 28, and the other end of the webbing 24 is fixed to the anchor 52. The anchor 52 may, for example, be fixed to the seat 48. Alternatively, the anchor 52 may be fixed to the body 36, e.g., the pillar 26, the floor, etc. The anchor 52 may be attached to the seat 48 in any suitable manner, e.g., with fasteners. The webbing 24 may be fabric, e.g., woven nylon. The latch plate 54 slides freely along the webbing 24 and, when engaged with the buckle 56, divides the webbing 24 into a lap band and a shoulder band. The seatbelt assembly 50 may include the D-ring 30, the D-ring 30 engaged with the webbing 24. For example, the webbing 24 may freely slide through the D-ring 30. In other words, the webbing 24 may extend from the seatbelt retractor 28 through the D-ring 30 to the anchor 52. The D-ring 30 is supported by and vertically movable relative to the pillar 26, e.g., toward or away from the roof 38. The D-ring 30 may be spaced from the seatbelt retractor 28. For example, the D-ring 30 may be disposed between the seatbelt retractor 28 and the roof 38. The seatbelt retractor 28 may be adjacent to the floor. The seatbelt assembly 50 may be a three-point harness, meaning that the webbing 24 is attached at three points around the occupant when fastened the anchor 52, the seatbelt retractor 28, and the buckle 56. The seatbelt assembly 50 may, alternatively, include another arrangement of attachment points.

The system 22 includes the actuator 32 for vertically moving the D-ring 30 relative to the pillar 26, e.g., toward or away from the roof 38. The actuator 32 may be a linear actuator that can increase or decrease in length between points on the actuator 32. For example, the actuator 32 may include a motor 58, a lead screw 60, and a nut (not shown). The motor 58 may be operatively coupled to the nut such that torque from the motor 58 rotates the nut relative to the lead screw 60 to increase or decrease the length of the actuator 32, e.g., depending on a rotation direction of the motor 58. As another example, the actuator 32 may include a rack and pin 70 ion (not shown), or any other suitable mechanical and/or electromechanical structure for vertically moving the D-ring 30 relative to the pillar 26, e.g., in response to a command from the computer 34.

Figure 2:
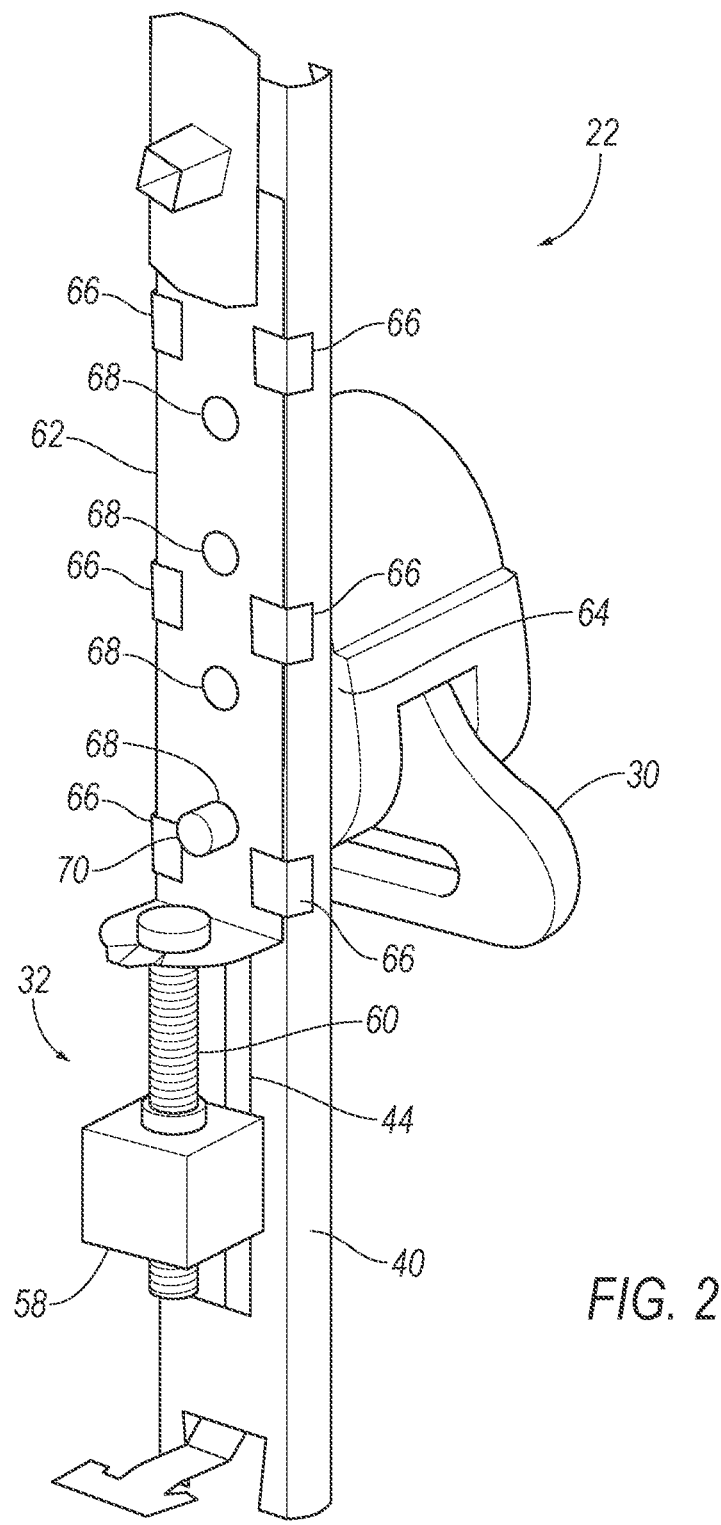
FIG. 2 is a perspective view of components of the system for decreasing tension of the seatbelt webbing.
Figure 3:
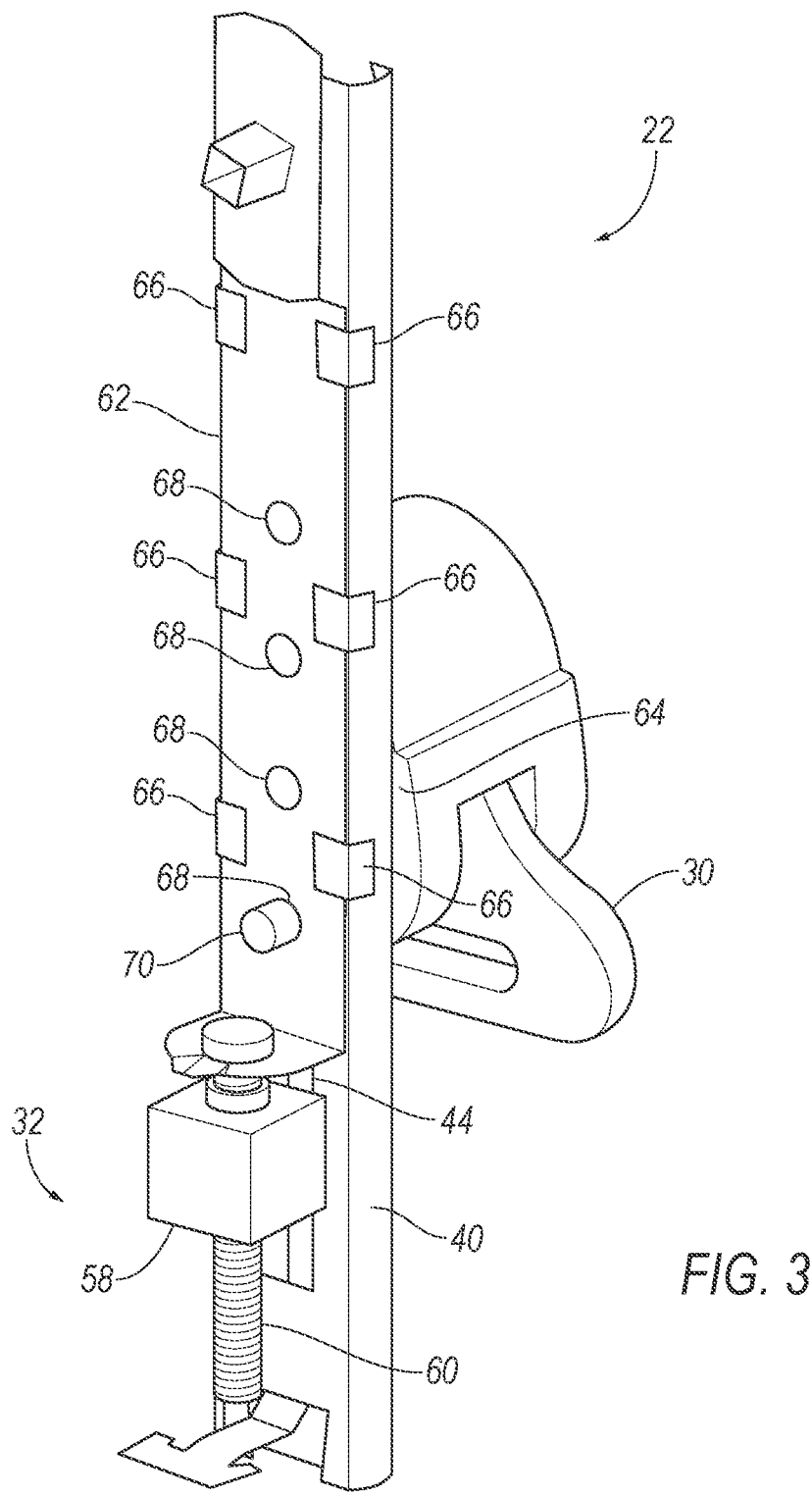
FIG. 3 is another perspective view of components of the system for decreasing tension of the seatbelt webbing.
Figure 4:
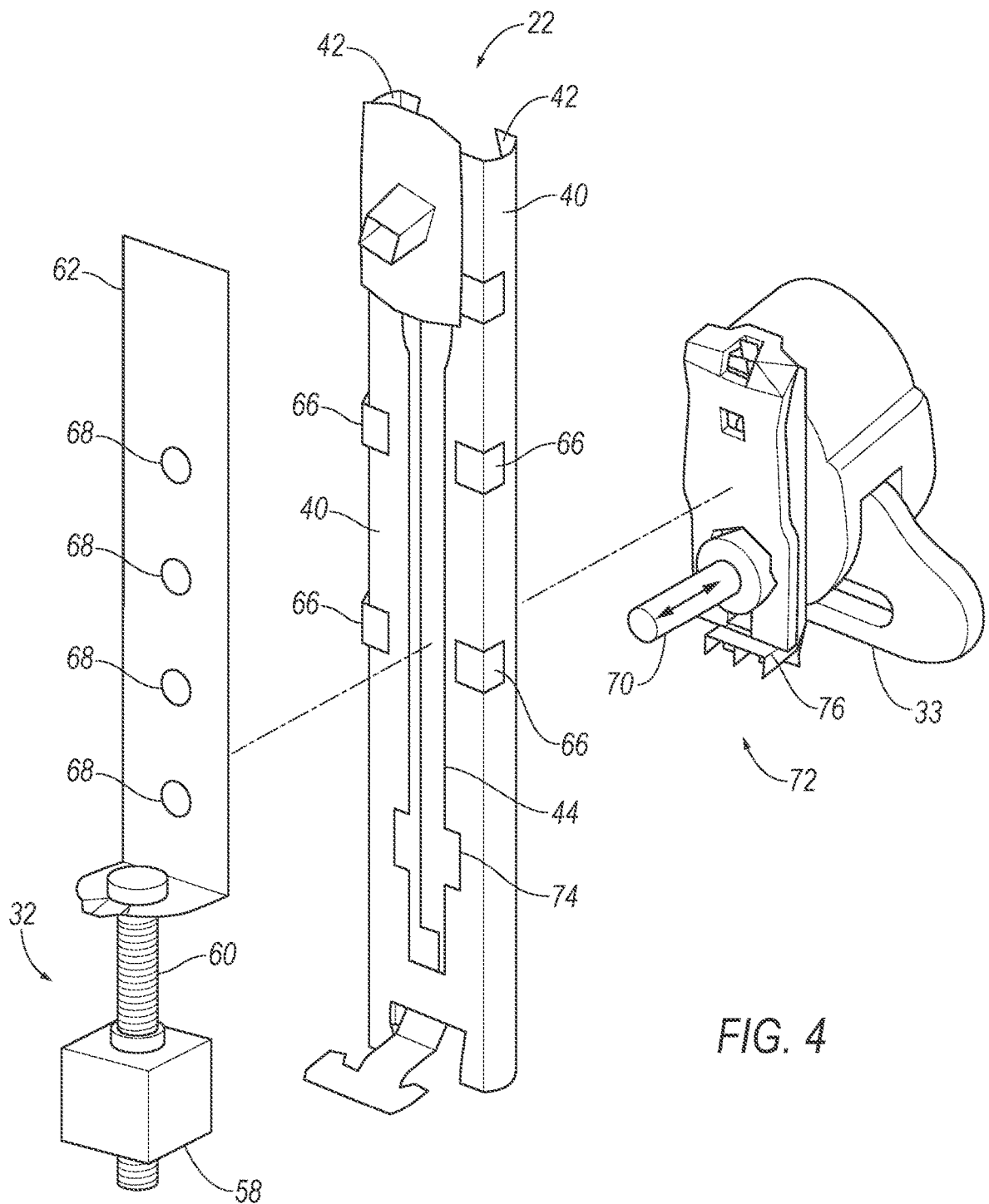
FIG. 4 is an exploded view of components of the system for decreasing tension of the seatbelt webbing.

With reference to FIGS. 2-4, the D-ring 30, actuator 32, the track 40, a first base 62, and a second base 64 are shown. The actuator 32 operatively coupled to the D-ring 30 to vertically move the D-ring 30 relative to the pillar 26, e.g., via the first base 62 and/or the second base 64. In other words, the actuator 32 is connected to the D-ring 30, either directly or via one or more components, such that actuation of the actuator 32 moves D-ring 30 toward or away from the roof 38. The actuator 32 may be operatively coupled to the first base 62 to vertically move the first base 62 relative to the pillar 26. For example, the actuator 32 may be operatively coupled to the track 40 and the first base 62 to move the first base 62 relative to the track 40. In such example, the motor 58 may be fixed relative to the track 40 and the lead screw 60 may be fixed relative to the first base 62. The motor 58 may be fixed to the track 40 and the lead screw 60 may be fixed to the base, e.g., via fastener, weld, etc. Any other suitable structure may be included in the system 22 to operatively couple the actuator 32 to the D-ring 30.

The first base 62 is supported by the pillar 26. The first base 62 may be supported by the support column, e.g., by the track 40, between the trim cover and the body panel. The first base 62 is vertically movable relative to the pillar 26, e.g., toward or away from the roof 38. The first base 62 may be movable along the track 40. For example, the first base 62 may be slidable along an outboard surface of the track 40, e.g., between the track 40 and the body panel. A plurality of tabs 66 may be fixed to the track 40. The tabs 66 may retain the first base 62, e.g., against the track 40. The tabs 66 may be on opposing sides of the first base 62 and extends away from the first base 62 and toward each other. The first base 62 may be between the tabs 66 in a width direction of the first base 62. The first base 62 may be between the track 40 and the tabs 66 in the thickness direction of the first base 62. The first base 62 may slide relative to the track 40 and the tabs 66 along the longitudinal length of the first base 62.

The first base 62 may define a plurality of holes 68 vertically spaced from each other. In other words, the holes 68 may each be at a different spacing from the roof 38. The holes 68 may extend through the first base 62 in a thickness direction of the first base 62. The holes 68 may be spaces from each other along a longitudinal length of the first base 62. The holes 68 may be aligned with the slot 44 of the first base 62.

The second base 64 is supported by the pillar 26. The second base 64 may be supported by the support column, between the trim cover and the body panel. The second base 64 may be vertically movable relative to the pillar 26 and/or to the first base 62. For example, the second base 64 may be supported by, and movable along the track 40. Edges of the second base 64 may be disposed within the channels 42 of the track 40, permitting movement of the second base 64 parallel to the elongation of the channels 42, and inhibiting transverse movement. The track 40 may be between the first base 62 and the second base 64. For example, the first base 62 maybe outboard of the track 40 and the and the second base 64 may be inboard of the track 40 (e.g., relative to the passenger compartment 46).

The D-ring 30 may be supported by, and vertically movable relative to, the first base 62, e.g., via the second base 64. The D-ring 30 may be supported by the second base 64. For example, the D-ring 30 may be attached to the second base 64 with a swivel that permits rotation of the D-ring 30 relative to the second base 64 and inhibits translation of the of the D-ring 30 relative to the second base 64. Any other suitable structure can be used to the support D-ring 30, e.g., fastener, bracket, etc.

The D-ring 30 and the second base 64 may be selectively coupled to the first base 62, i.e., to selectively permit or inhibit movement, e.g., vertically, the D-ring 30 and the second base 64 relative to the first base 62. For example, the D-ring 30 and/or the second base 64 may support a pin 70 movable to an engaged position, shown in FIGS. 2-3, and a disengaged position (not shown). The pin 70 in the engaged position may inhibit movement of the D-ring 30 and/or the second base 64 relative to the first base 62, e.g., vertically toward or away from the roof 38. The pin 70 in the engaged position may be disposed within one of the plurality of holes 68 of the first base 62. The pin 70 in the engaged position may extend through the slot 44 of the track 40 to the into the respective hole 68. Normal forces between the pin 70 and the first base 62 may inhibit movement of the D-ring 30 relative to the first base 62. The pin 70 in the disengaged position may permit movement of the D-ring 30 and/or the second base 64 relative to the first base 62. The pin 70 in the disengaged position may be completely outside the hole 68 of the first base 62. The pin 70 in the disengaged position generally does not apply normal forces to the first base 62 at the hole 68.

The pin 70 may be biased to the engaged position. For example, a spring (not shown) or the like may be supported by the D-ring 30 or the second base 64 and urge the pin 70 toward the engaged position. The pin 70 may be operatively coupled to a user interface (also not shown), such as a button. Actuation of the user interface may urge the pin 70 to the disengaged position, e.g., as known. A user may actuate the user interface and move the pin 70 to the disengaged position and vertically position the D-ring 30, e.g., placing the pin 70 in the engaged position in a higher or lower hole 68 of the first base 62. The system 22 may include any other suitable structure to selectively couple the D-ring 30 to the base, e.g., such that an occupant can adjust a height of the D-ring 30.

The system 22 may include a stop 72 that limits movement of the second base 64 relative to the track 40. The stop 72 may transfer force from the D-ring 30 to the pillar 26, e.g., to the track 40 and independent of the actuator 32, the first base 62, the pin 70, etc. With reference to FIGS. 4, 5A, and 5B, the stop 72 may include a second slot 74 defined by the track 40 and a tongue 76 extending from the second base 64 toward the track 40. The second slot 74 may extend perpendicular to the slot 44 along the length of the track 40. The tongue 76 may extend toward the track 40 and have a shape configured to fit within the second slot 74. Under normal operation the tongue 76 may be spaced from the track 40, as shown in FIG. 5A. Normal operation includes movement of the D-ring 30 relative to the track 40, e.g., via the actuator 40 or manually by the occupant. Application of a threshold amount of force to the D-ring 30, e.g., from the webbing 24 and caused by an impact to the vehicle 20, may deform the actuator 32, the pin 70, or other structure. The second base 64 may be urged downward and the tongue 76 may engage the second slot 74, e.g., the tongue 76 being disposed therein as shown in FIG. 5B, to transfer force from the second base 64 to the support pillar 26 via the track 40. With reference to FIGS. 6A and 6B, the stop 72 may include a plurality of teeth 78 arranged along the track 40. Each of the teeth 78 may be asymmetrical and configured to inhibit downward movement, e.g., away from the roof 38. Under normal operation the teeth 78 may be spaced from the tongue 76 of the second base 64 as shown in FIG. 6A, e.g., permitting an occupant or the actuator 40 to raise or lower the D-ring 30. Application of a threshold amount of force to the D-ring 30 may deform the actuator 32, the pin 70, or other structure. The second base 64 may be urged downward and the tongue 76 of the second base 64 may engage one or more of the teeth 78 to transfer force therebetween, as shown in FIG. 6B.

Figure 7:
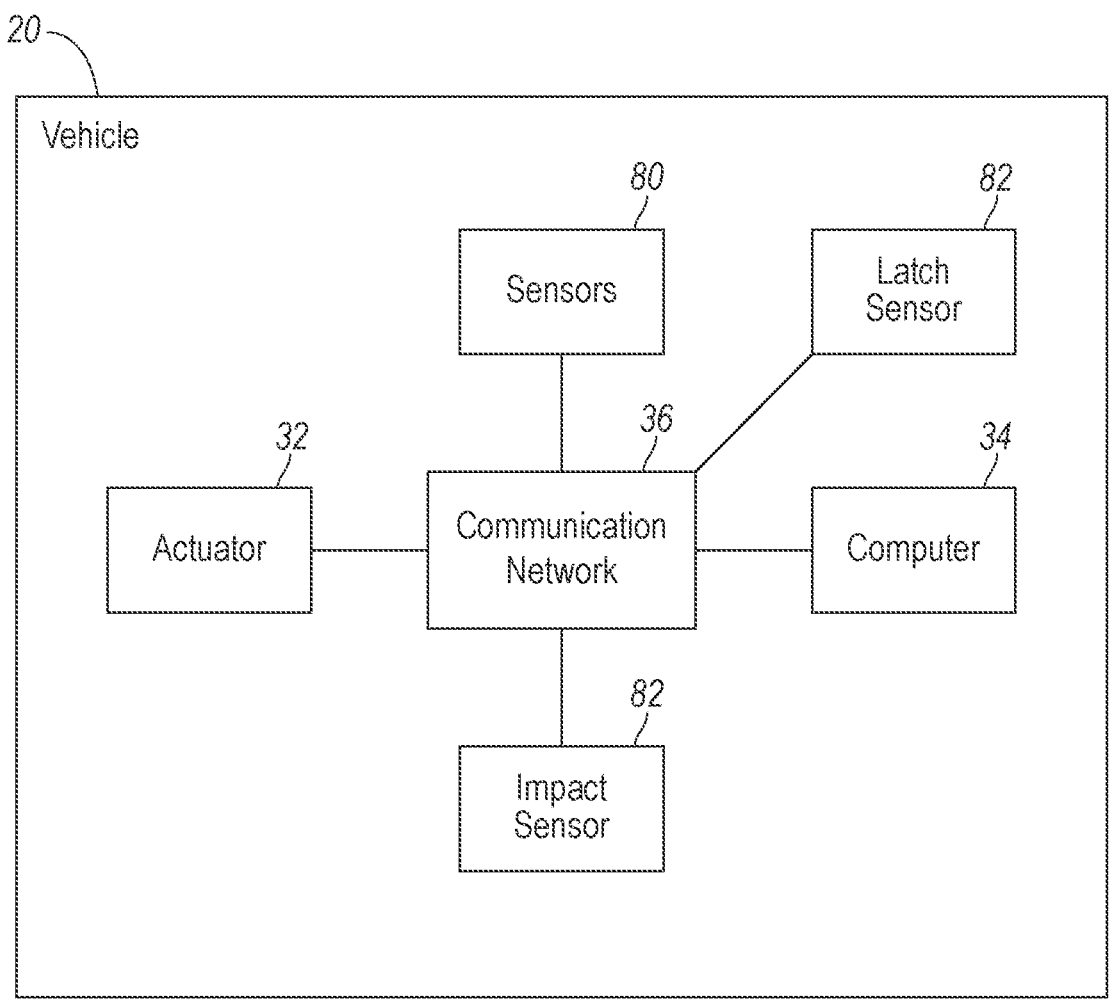
FIG. 7 is a block diagram of components of the vehicle.

With reference now to FIG. 7, the system 22 can include a tension sensor 80 configured to detect the tension of the webbing 24. The tension sensor 80 may include a strain gage, or other suitable structure. The tension sensor 80 can be supported at, e.g., fixed to, the seatbelt anchor 52 connected to the seatbelt webbing 24, or at any other suitable location. Tension of the seatbelt webbing 24 may generate stain in the anchor 52 and the tension sensor 80 may detect such strain.

The system 22 may include a latch sensor 82 that detects when the latch plate 54 6 is buckle 56d, i.e., when the latch plate 54 is engaged with the buckle 56. The latch sensor 82 may be a switch, a proximity sensor, or any suitable sensor. The latch sensor 82 may be supported by the buckle 56.

The system 22 can include an impact sensor 84 that is configured to detect an impact to the vehicle 20. The impact sensor 84 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 84 may be located at numerous points in or on the vehicle 20.

The computer 34 includes a processor and a memory. The memory includes one or more forms of computer readable media, and stores instructions executable by the processor for performing various operations, processes, and methods, including a process 800 and as disclosed herein. For example, the computer 34 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 34 may be a restraints control module. In another example, computer 34 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal system 22s such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 34. The memory can be of any type, e.g., hard disk drives, solid state drives, servers, or any volatile or non-volatile media. The memory can store the collected data sent from the sensors.

The computer 34 is generally arranged for communications on a communication network 86 that can include a bus in the vehicle 20 such as a controller area network (CAN) or the like, and/or other wired and/or wireless mechanisms. Via the communication network 86, the computer 34 may transmit messages to various devices in the vehicle 20, and/or receive messages (e.g., CAN messages) from the various devices, e.g., the various sensors, etc. Alternatively or additionally, in cases where the computer 34 comprises a plurality of devices, the communication network 86 may be used for communications between devices represented as the computer 34 in this disclosure.

The computer 34 is programed to, i.e., the memory stores instructions executable by the processor to, determine that the seatbelt retractor 28 in a nuisance locked state. The retractor in the nuisance locked state inhibits movement of the webbing 24 and limit movement of the occupant when it is not desired to control kinematics of the occupant. For example, declaration of the vehicle 20, an incline of the surface supporting the vehicle 20, or other factors could cause the retractor 28 to lock, and remain locked, thereby inhibiting movement of the occupant, e.g., when no impact to the vehicle 20 has occurred. In contrast, the seatbelt retractor 28 may lock to when it is desired to control kinematics of the occupant, e.g., in response to an impact to the vehicle 20. The computer 34 may determine the that the seatbelt retractor 28 is in the nuisance based on data received via the communication network 86. The computer 34 may determine that the seatbelt retractor 28 is in the nuisance locked state based on detecting a tension of the webbing 24 that is greater than a predetermined threshold. In other words, the tension in the webbing 24 above the predetermined threshold may indicate that the seatbelt retractor 28 is in the locked state. The computer 34 may further compare the tension in the webbing 24 with a second predetermined threshold and determine the seatbelt retractor 28 is in the nuisance lock state when the tension is below the second predetermined threshold. The computer 34 may detect the tension of the webbing 24 with the tension sensor 80 or any other suitable structure. The predetermined threshold and the second predetermined may be based on empirical testing, e.g., the predetermined threshold being an amount of tension generally detected when an occupant is leaning on the webbing 24 and the second predetermined threshold being an amount of tension generally detected when the second base 64 is engaged with the stop 72. The computer 34 may determine the seatbelt retractor 28 is in the nuisance locked state based on data from other sensors, e.g., indicating a position of a pawl of the seatbelt retractor 28 or other suitable data.

The computer 34 is programed to, i.e., the memory stores instructions executable by the processor to, determine whether the latch plate 54 is buckle 56d or unbuckled from the buckle 56, e.g., based on data received from the latch sensor 82.

The computer 34 is programmed to command the actuator 32 to move the D-ring 30 vertically relative to the pillar 26, e.g., upward or downward. Moving the D-ring 30 downward may reduce tension of the webbing 24 and alleviate the nuisance lock. The computer 34 may command the actuator 32 by transmitting the command to the actuator 32 via the communication network 86. The command may specify a length, a direction of rotation for the motor 58, a number of turns of such rotation, or any other suitable command to control to actuator 32 and move the D-ring 30. Similarly, the computer 34 may be programmed to command the actuator 32 to move the D-ring 30 upward. The computer 34 may command the actuator 32 to move the D-ring 30 vertically downward in response determining that the seatbelt retractor 28 is in the nuisance locked state. The computer 34 may command the actuator 32 to move the D-ring 30 vertically downward in response determining that the latch plate 54 is unbuckled.

The computer 34 is programmed to determine an impact to the vehicle 20, e.g., based on data from the impact sensor 84 and as known. For example, the impact sensor 84 may indicate acceleration of the vehicle 20 above a threshold, deformation of a certain vehicle component, etc. The computer 34 may determine that no impact to the vehicle 20 has been detected before commanding the actuator 32 to move the D-ring 30 vertically downward relative to the pillar 26.

Figure 8:
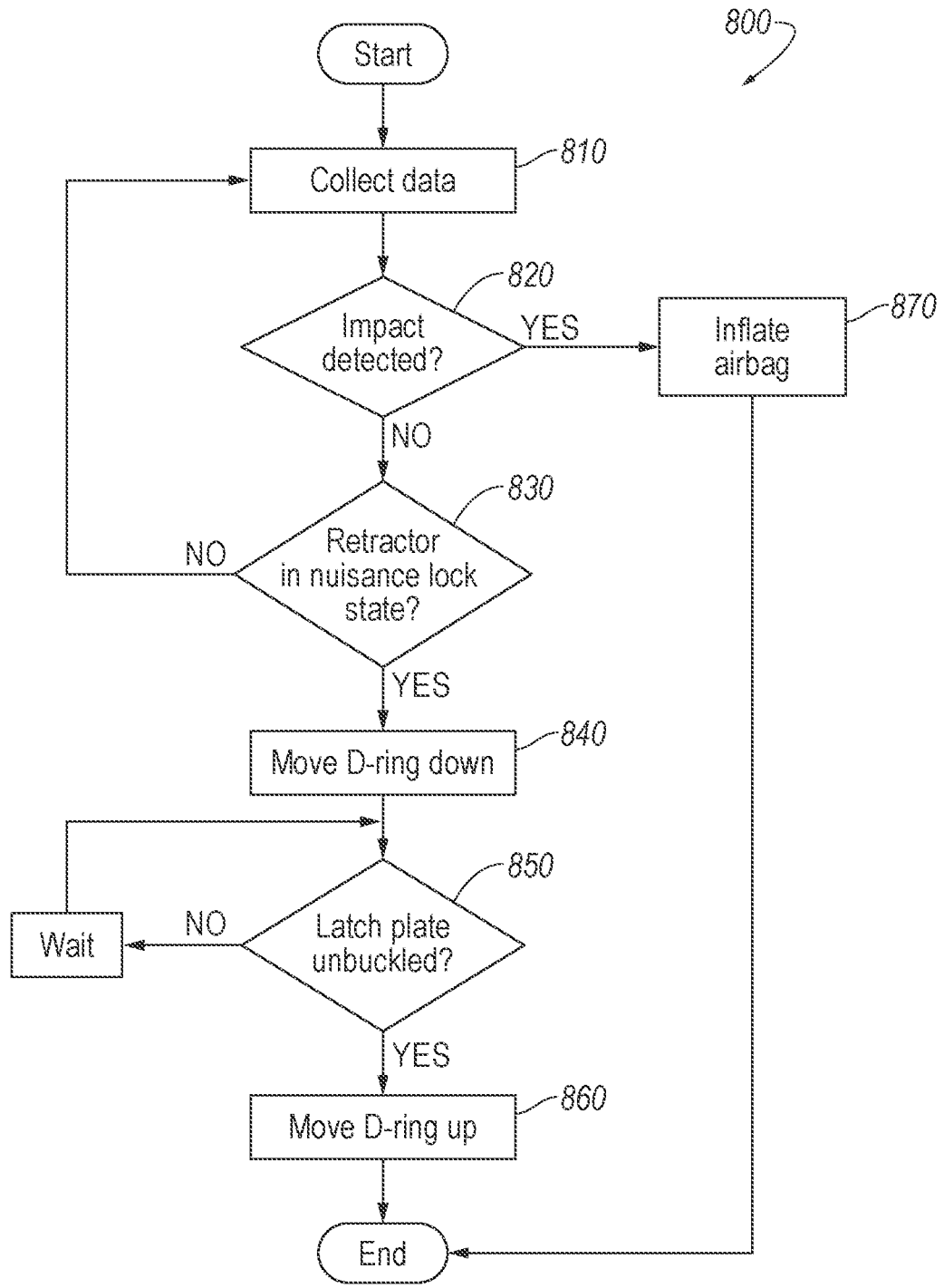
FIG. 8 is a flow chart illustrating a process of controlling the system.

With reference to FIG. 8, a flow chart illustrating a process 800 for controlling the system 22 is shown. The process starts with the vehicle 20 operating under typical conditions, e.g., with the latch plate 54 buckle 56d into the buckle 56, with tension in the seatbelt webbing 24 below the predetermined threshold, without having detected an impact to the vehicle 20, etc. At the initial block 810, the computer 34 collects data, e.g., the tension sensor 80, the impact sensor 84, etc., via the communication network 86. The computer 34 may collect such data continuously, at intervals (e.g., every 100 milliseconds), etc. The computer 34 may collect such data throughout the process 800.

At a block 820, the computer 34 determines whether an impact to the vehicle 20 has been detected, e.g., based on data received from the impact sensor 84 via the communication network 86. For example, the computer 34 may determine an impact has occurred in response to receiving a signal from the impact sensor 84 indicating the impact. The computer 34 may determine an impact has not occurred based on a lack of signal from the impact sensor 84. In response to determining that no impact to the vehicle 20 has been detected the computer 34 moves to a block 830. Else, e.g., in response to determining that an impact has been detected, the computer 34 may move to a block 870.

At the block 830 the computer 34 determine whether the seatbelt retractor 28 in the nuisance locked state. The computer 34 may determine the seatbelt retractor 28 in the nuisance locked state based on data from the tension sensor 80, e.g., indicating detected tension above the predetermined threshold and below the second predetermined threshold. In response to determining that the seatbelt retractor 28 in the nuisance locked state the computer 34 may move to a block 840. Else, the computer 34 may return to the block 810.

At the block 840 the computer 34 may command the actuator 32 to move the D-ring 30 downward relative to the pillar 26. For example, the command may specify rotation of the motor 58 in a first direction.

Next, at a block 850, the computer 34 determines whether the latch plate 54 has been unbuckled from the buckle 56, e.g., based on data from the buckle 56 sensor. Upon determining the latch plate 54 has been unbuckled the computer 34 moves to a block 860. Else, the process 800 may wait, e.g., until detecting that the latch plate 54 has been unbuckled.

At the block 860, the computer 34 may command the actuator 32 to move the D-ring 30 upward relative to the pillar 26. For example, the command may specify rotation of the motor 58 in a second direction position direction. After the block 860 the process 800 may end. Alternately, the computer 34 may return to the block 810.

At the block 870 the computer 34 may actuate one or more other vehicle components, e.g., inflate an airbag or actuate other structure for controlling kinematics of the occupant. After the block 870 the process 800 may end.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a pillar;
   a seatbelt retractor;
   a D-ring supported by and vertically movable relative to the pillar;
   a webbing extending from the seatbelt retractor and through the D-ring;
   an actuator operatively coupled to the D-ring to vertically move the D-ring relative to the pillar; and
   a computer having a processor and a memory storing instructions executable by the processor to determine that the seatbelt retractor is in a nuisance locked state, and in response to determining that the seatbelt retractor is in the nuisance locked state, command the actuator to move the D-ring vertically downward relative to the pillar.

2. The system of claim 1, wherein the instructions include instructions to determine that the seatbelt retractor is in the nuisance locked state based on detecting a tension of the webbing that is greater than a threshold.

3. The system of claim 2, further comprising an anchor fixed to the webbing and a tension sensor at the anchor and configured to detect the tension of the webbing.

4. The system of claim 1, wherein the instructions include instructions to determine that no impact has been detected before commanding the actuator to move the D-ring vertically downward relative to the pillar.

5. The system of claim 1, further comprising a first base supported by and vertically movable relative to the pillar, and wherein the D-ring is supported by the first base and the actuator is operatively coupled to the first base to vertically move the first base relative to the pillar.

6. The system of claim 5, wherein the D-ring is vertically movable relative to the first base.

7. The system of claim 6, further comprising a pin movable to an engaged position and a disengaged position, the pin in the engaged position inhibiting movement of the D-ring relative to the first base and in the disengaged position permitting movement of the D-ring relative to the first base.

8. The system of claim 7, wherein the first base defines a plurality of holes vertically spaced from each other, the pin in the engaged position disposed within one of the plurality of holes.

9. The system of claim 5, further comprising a second base supported by and vertically movable relative to the pillar, and wherein the D-ring is supported by the second base.

10. The system of claim 9, wherein the pillar includes a track, and the first base and the second base are movable along the track.

11. The system of claim 10, wherein the track is between the first base and the second base.

12. The system of claim 10, further comprising a stop that limits movement of the second base relative to the track.

13. The system of claim 12, wherein the stop includes a slot defined by the track and a tongue extending from the second base.

14. The system of claim 12, wherein the stop includes a plurality of teeth arranged along the track.

15. The system of claim 10, wherein the actuator is operatively coupled to the track and the first base to move the first base relative to the track.

16. The system of claim 15, wherein the actuator includes a motor fixed relative to the track and a lead screw fixed relative to the first base.

17. The system of claim 9, wherein the second base is vertically movable relative to the first base.

18. The system of claim 17, further comprising a pin movable to an engaged position and a disengaged position, the pin in the engaged position inhibiting movement of the second base relative to the first base and in the disengaged position permitting movement of the second base relative to the first base.

* * * * *